United States Patent
Cassiano et al.

(10) Patent No.: US 8,054,023 B2
(45) Date of Patent: Nov. 8, 2011

(54) METHOD AND RELATED CIRCUIT FOR DRIVING A SENSORLESS BRUSHLESS MOTOR

(75) Inventors: Michele Cassiano, Cornaredo (IT); Ezio Galbiati, Agnadello (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 605 days.

(21) Appl. No.: 12/182,202

(22) Filed: Jul. 30, 2008

(65) Prior Publication Data
US 2009/0033263 A1 Feb. 5, 2009

(30) Foreign Application Priority Data
Aug. 1, 2007 (IT) .............................. VA2007A0068

(51) Int. Cl.
*H02P 6/18* (2006.01)
(52) U.S. Cl. ......... 318/400.34; 318/400.01; 318/400.35; 318/459
(58) Field of Classification Search ............. 318/400.34, 318/459, 599, 811, 400.01, 400.32, 400.35, 318/779, 799, 437; 704/213
See application file for complete search history.

(56) References Cited

U.S. PATENT DOCUMENTS

| | | | | |
|---|---|---|---|---|
| 5,317,243 A * | 5/1994 | Cameron | ................ | 318/400.35 |
| 5,517,095 A * | 5/1996 | Carobolante et al. | ..... | 318/400.35 |
| 5,969,491 A * | 10/1999 | Viti et al. | ................ | 318/400.35 |
| 6,420,847 B1 * | 7/2002 | Galbiati et al. | ............... | 318/727 |
| 6,566,832 B2 * | 5/2003 | Ataee | ............................ | 318/560 |
| 6,979,970 B2 * | 12/2005 | Iwanaga et al. | ........... | 318/400.35 |
| 7,034,478 B2 * | 4/2006 | Bhaumik et al. | .......... | 318/400.35 |
| 7,102,307 B2 * | 9/2006 | Shao | ........................ | 318/400.35 |
| 7,141,949 B2 * | 11/2006 | Harwood | ................. | 318/400.35 |
| 7,230,785 B2 * | 6/2007 | Itagaki et al. | ............... | 360/73.03 |

* cited by examiner

*Primary Examiner* — Walter Benson
*Assistant Examiner* — Antony M Paul
(74) *Attorney, Agent, or Firm* — Lisa K. Jorgenson; Allen, Dyer, Doppelt, Milbrath & Gilchrist, P.A.

(57) ABSTRACT

A method of driving a sensorless brushless motor in PWM mode includes tristating a winding during a time window for detecting a zero-cross of the back electromotive force induced in the winding by rotation of a rotor, monitoring voltage of the tristated winding during an unmasked portion of the time window, and detecting during the time window a zero-cross event of the induced back electromotive force. The method includes verifying whether the zero-cross event occurred during the unmasked portion, modifying for the next cycle the duration of the time window and/or of the unmasked portion thereof based upon the verification, defining a safety interval in the unmasked time window, modifying the duration of the time window and/or of the unmasked portion thereof depending on whether the zero-cross event has been detected during the safety interval.

23 Claims, 4 Drawing Sheets

METHOD AND RELATED CIRCUIT FOR DRIVING A SENSORLESS BRUSHLESS MOTOR

FIELD OF THE INVENTION

This invention relates in general to electric motors and, more particularly, to a method of monitoring the back electromotive force (BEMF) induced in a phase winding of a sensorless brushless motor driven in pulse with modulation (PWM) mode.

BACKGROUND OF THE INVENTION

Brushless motors have a permanent magnet rotor and a stator comprising a plurality of phase windings that may be coupled in star or polygonal configurations, or may be independent one from the other. In the motors with phase windings in a star or polygonal configuration, a number of taps equal to the number of phase windings of the motor (eventually +1, if also the neutral point is made accessible) are externally available. In motors where the phase windings are independent from each other, the connector taps of the phase windings are accessible.

These kind of motors are often used in applications for hard disks and DVD drives, for moving the magnetic tape in videorecorders, for CD players and the like.

Most often, brushless motors are three-phase motors, the driving circuit comprising of integrated circuits the output stage of which powers the phase windings, and may have a three-phase inverter bridge architecture, in case of star or triangle connected motors, or a three full-bridge architecture in case of motors with independent phase windings.

For sake of clarity, reference is made hereinafter only to three-phase star connected brushless motors, but the considerations that will be made hold also for motors with other numbers of windings and/or different connection schemes.

Referring to three-phase motors, the most typical driving mode is the "bipolar" mode, in which at each instant two phase windings are driven while the third phase winding is in high impedance state (or tristate).

The phase windings to be driven are switched according to a cyclic sequence that may be synchronized with the instantaneous position of the rotor, that typically is established by monitoring the back electromotive force (BEMF) sensed on the phase winding that is at the moment in a high impedance state. In this case, usually the zero-cross instant of the BEMF voltage is monitored, this voltage is sinusoidal or at least periodic.

A common technique for estimating the rotor position of a brushless poly-phase motor is disclosed in the European patent application EP 892 488 and includes setting a time window during which the output of a leg or a half-bridge (or of a bridge, in case of driving of motors with independent phases) of the driving stage is tristated, thus allowing the BEMF of the phase winding coupled thereto to be read.

The time window may have a constant time duration independent from functioning parameters of the motor, or a time duration that may vary in function of the motor speed or in function of other events such as the detected zero-cross (briefly ZC) instants of the BEMF and the distance of the zero-cross instant from the expected instant.

The optimal definition of the time window of the ZC of the BEMF, calculated in electrical degrees before the expected ZC, is the result of a compromise between precision of the detection of the position and driving efficiency of the motor.

When the motor is being accelerated, ZC events are determined with an uncertainty proportional to the acceleration, thus in this situation a sufficiently longer time window is chosen for determining correctly the position. However, choosing a longer time window reduces the efficiency of the driving, because tristating the monitored phase winding causes a distortion of the current profile, thus the duration of the time window should be as short as possible.

An algorithm for automatically adjusting the duration of the time window at every electrical revolution depending on a flag, EarlyZC, that signals whether the rotor position during the previous electrical revolution was as expected or not for extending (when EarlyZC is logically high) or shortening (when EarlyZC is logically low) the time window, is known.

The functioning of this algorithm is schematically illustrated in FIG. 1. An initial value is given to a pointer POINTER to a look-up table in which durations of the time window and of the masked portion thereof are stored. When a zero-cross event (ZC) is detected, it is checked whether it occurred during the masked portion of the time window (EarlyZC=1) or not. If this condition is verified, the pointer POINTER is incremented (unless it has already attained the maximum admissible value MAX) in order to increase the duration of the time window, otherwise it is checked whether the pointer is equal to the minimum value (MIN) or to a steady-state value (TARGET). If none of these two conditions is verified, the pointer is decremented for reducing the duration of the time window, otherwise it is left unchanged and the next zero-cross is waited for.

A drawback of this known algorithm is that, when the motor accelerates, in order to catch the zero-cross of the BEMF in a phase winding during the unmasked portion of the time window, during which the winding is tristated, the algorithm should be capable of significantly increasing or decreasing from a revolution to the next the duration of the masking time. This tends to worsen sensibly the driving efficiency of the motor.

A method of driving a brushless motor that allows to adjust the duration of the masking in a more accurate way in shortening it, for preventing bounces back towards extended values because when excessively shortening the masking time, the motor brings the zero-cross event out of the unmasked portion of the time window would be desirable.

SUMMARY OF THE INVENTION

A method and a related circuit has been found for PWM driving a sensorless brushless motor that effectively reduce variations of the duration of the time window and/or of the unmasked portion thereof, from a revolution to the next, thus making the driving of the motor more stable, efficient and precise.

According to the method, a safety interval is defined in the unmasked time window and it is verified whether the zero-cross event occurs in the masked portion of the time window or if it occurs in the safety interval or not. Depending on which condition is verified, it is decided whether to leave unchanged or to modify the duration of the time window and/or of the unmasked portion thereof.

The duration of the unmasked portion of the time window is shortened if the zero-cross event occurs during it but out of the safety interval, and/or is left unchanged if the zero-cross event occurs during the safety interval.

Figure 1:
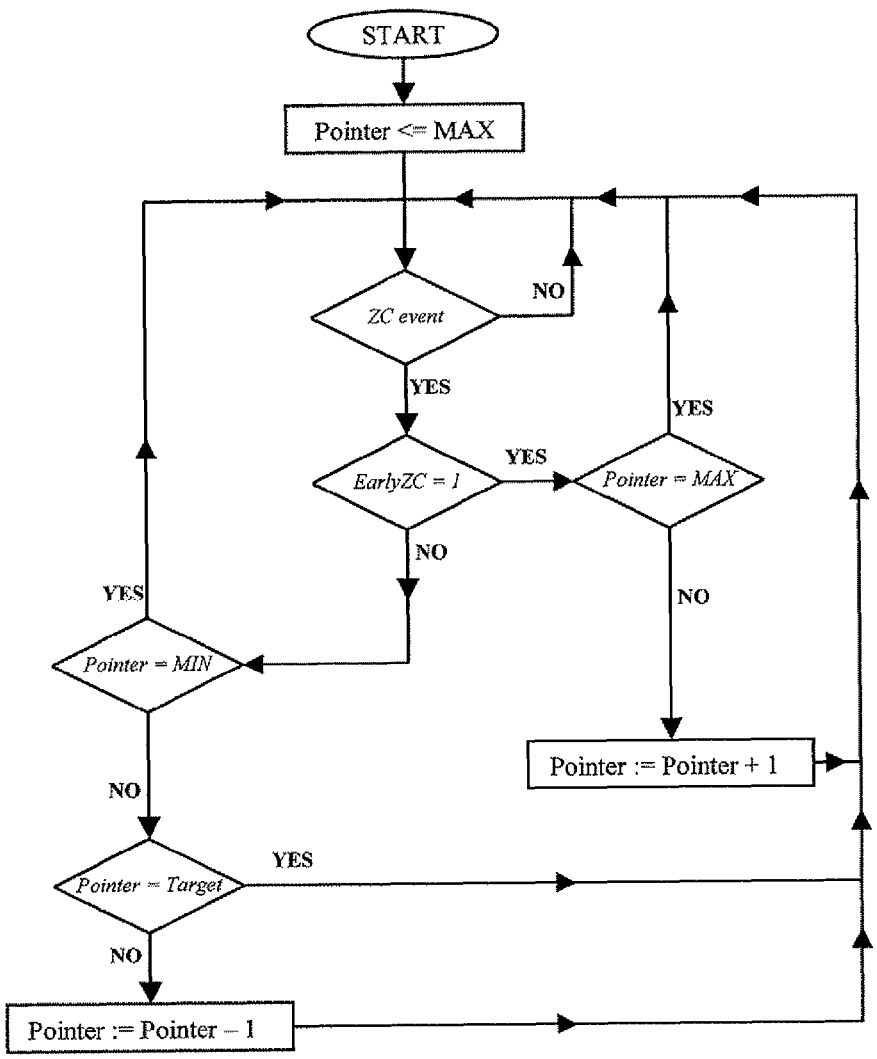
FIG. 1 depicts a flow-chart that illustrates a method of driving a brushless motor, in accordance with the prior art.

FIGS. from 3 to 5 represent time graphs of the main signals of the circuit of FIG. 1 that illustrates the method of this invention.

Figure 6:
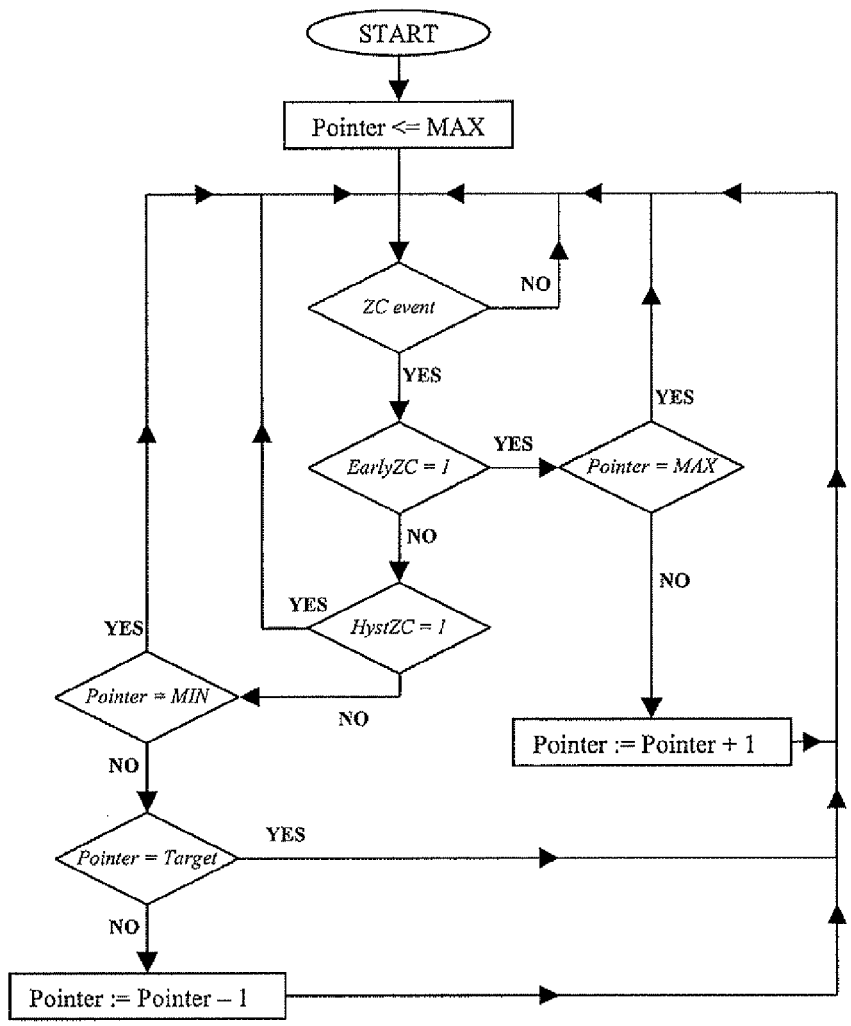

FIG. 6 depicts a flow-chart that illustrates a preferred embodiment of the method of this invention.

DETAILED DESCRIPTION OF THE PREFERRED EMBODIMENTS

Figure 2:
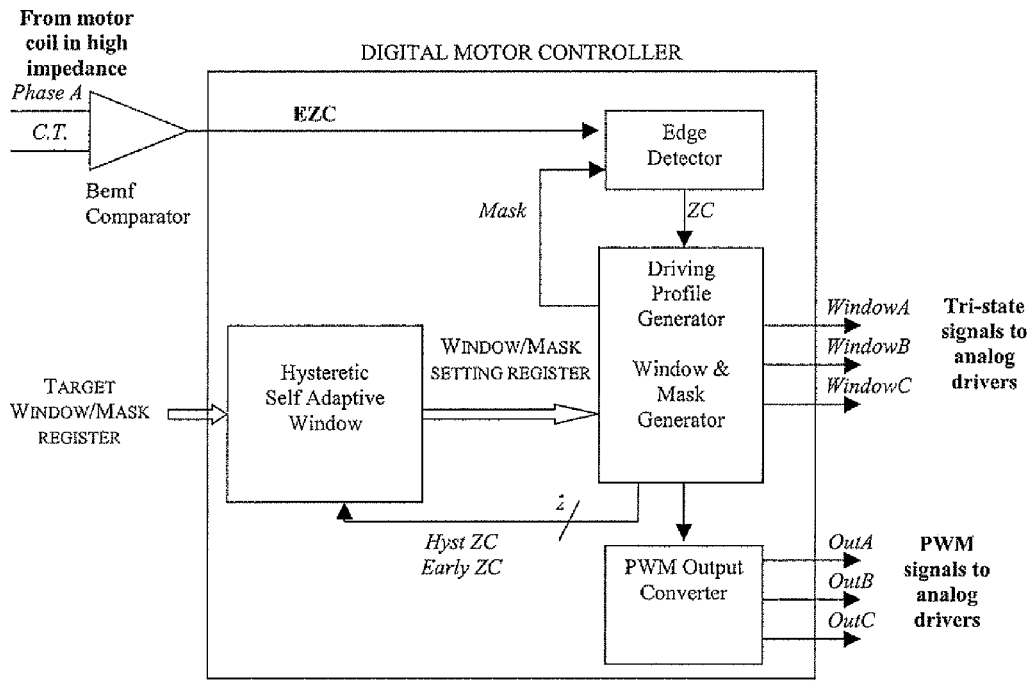
FIG. 2 depicts a block diagram of a driving circuit of a brushless motor of this invention.

An objective of a method, implemented by the driving circuit a block diagram of which is shown in FIG. 2, is of increasing the stability of the automatic regulation algorithm by "slowing down" the variation of the duration of the time window during which a zero-cross event has been detected.

The driving circuit (digital motor controller) is coupled to Bemf comparator, which is in turn coupled to a motor coil in high impedance. The Bemf comparator generates the flag EarlyZC (EZC). The driving circuit includes an edge detector to receiver the flag EZC as output by the Bemf comparator. The edge detector outputs the flag ZC to a driving profile generator and window & mask generator, and receives the masking signal therefrom, as will be explained below. The driving circuit also includes a hysteretic self adaptive window, which is coupled to an external target window/mask register. The hysteretic self adaptive window outputs a window/mask setting register to the driving profile generator and window & mask generator, and receives Hyst ZC and Early ZC flags therefrom. The driving profile generator and window & mask generator is in turn coupled to a PWM output converter, which outputs PWM signals to analog drivers. The driving profile generator and window & mask generator outputs tri-state signals to the analog drives as well.

In addition to the flag EarlyZC, another flag HystZC is present. This other flag, besides flagging whether the ZC event has been detected or not during a pre-defined safety interval in the unmasked portion of the time window, also flags the existence of a risk of an erroneous detection of a zero-cross of the back electromotive force (BEMF) that could lead to an undue reduction of the duration of the window for the successive electrical cycle.

Figure 3:
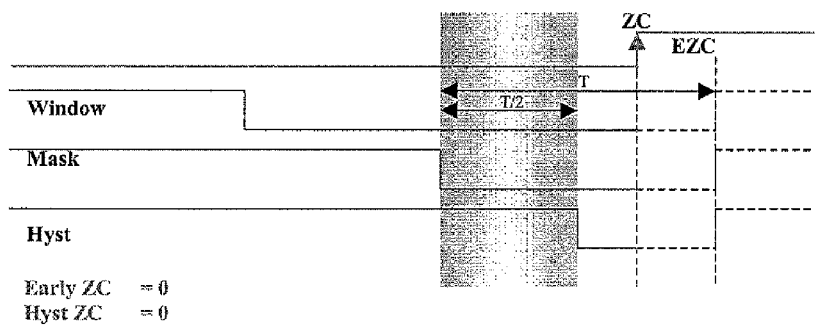
Figure 4:
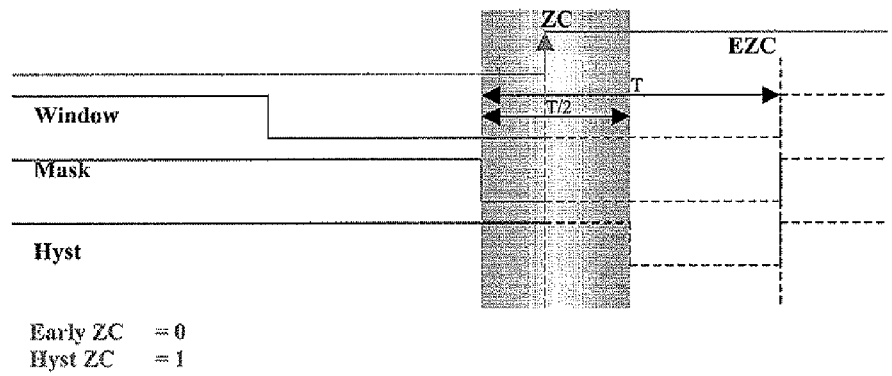
Figure 5:
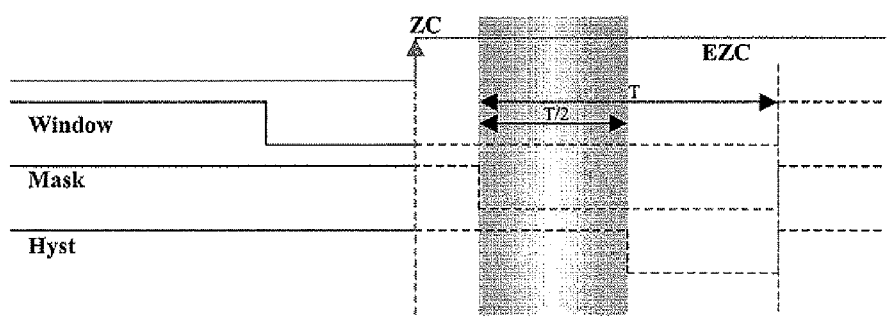

In practice, it is increased the number of options among which the automatic algorithm can choose depending on whether the zero-cross event occurs during the unmasked portion of the time window and out of the safety interval (FIG. 3), or if the zero-cross event occurs during the unmasked portion of the time window and during the safety interval (FIG. 4), or if the zero-cross event occurs out of the unmasked portion of the time window (FIG. 5).

The signal Window is the command for starting the time window by which a winding is tristated, Mask is a masking signal of a portion of the time window for preventing transient voltages from disturbing the detection of zero-cross events, and Hyst is a flag that identifies a safety interval inside an unmasked portion of the time window.

When a zero-cross event is detected, a sampling pulse ZC of the flags Mask and Hyst is generated, thus obtaining the logic samples EarlyZC and HystzC. If both samples are equal to 0 (FIG. 3), it means that the zero-cross event has been detected during the unmasked portion of the time window and out of the safety interval.

If both samples are equal to 1, it means that the zero-cross event has been detected during the masking time, thus a correction should be carried out.

If EarlyZC=0, it means that the zero-cross event occurred, as desirable, during the unmasked portion of the time window, or during the safety interval (HystZC=1) or out of it (HystZC=0). Depending on the value of HystZC, it is decided whether to keep unchanged or modifying the duration of the time window and of the masked portion thereof.

According to an embodiment, illustrated in the flow-chart of FIG. 6, if EarlyZC=1, the duration of the time window and the duration of the unmasked portion thereof are increased; by contrast, if EarlyZC=0, it is checked whether or not the zero-cross event occurred out of the safety interval and if at the same time these durations differ from a minimum pre-established duration MIN and from a pre-established steady-state value Target: only if both these conditions are met, these durations are shortened.

In practice, if HystZC=0, it means that the unmasked portion of the time window is relatively long and it is verified whether or not it is convenient to shorten it for making more efficient the driving of the motor.

According to the preferred embodiment, durations of the time window and of the masked portion thereof are stored in a look-up table and the stored values are selected by a pointer Pointer to the table.

The duration of the safety interval may be customized. Preferably, it will be fixed in function of the duration of the time window and of the masked portion thereof in the current electrical cycle and in function of the values that they should assume in the next electrical cycle, such to prevent zero-cross events during the masked portion of the time window. Tests carried out by the applicant showed that good results are obtained by fixing the duration of the safety interval equal to half of the unmasked portion of the time window, as depicted in FIGS. from 3 to 5.

The method has been described referring to the case in which only one flag Hyst, defining a safety interval, is available, but according to another embodiment it is possible to use more additional flags for defining a plurality of sub-intervals of the unmasked portion of the time window. By sampling this plurality of additional flags with the zero-cross pulse ZC, the sub-interval in which the zero-cross event is determined and the duration of the time window and of the unmasked portion thereof are chosen in an ever more refined manner. This embodiment will not be illustrated in detail because any skilled person will have immediately clear how to implement it from the above description.

That which is claimed:

1. A method of driving an electric motor in a pulse width modulation (PWM) mode comprising:
    tristating a motor winding of the electric motor during a time window to detect a zero-cross of the back electromotive force (BEMF) induced in the motor winding;
    monitoring a voltage on the tristated motor winding during an unmasked portion of the time window;
    detecting during the time window a zero-cross event of the induced BEMF;
    verifying whether the zero-cross event occurred during the unmasked portion of the time window;
    modifying a duration of the time window and a duration of the unmasked portion of the time window based upon the verification of the zero-cross event;
    defining a safety interval in the unmasked time window; and
    modifying the duration of the time window and of the unmasked portion of the time window based upon whether the zero-cross event is detected during the safety interval.

2. The method of claim 1, wherein the electric motor comprises a sensorless brushless motor.

3. The method of claim 1, further comprising:
generating an active mask flag for masking a portion of the time window;
generating an active safety flag for defining the safety interval;
sampling a logic value of the masking flag and the safety flag when the zero-cross event is detected; and
adjusting the duration of the unmasked portion of the time window for a successive switching cycle based upon logic values of the masking and safety flags.

4. The method of claim 3, wherein the safety interval is equal to half of the unmasked portion of the time window.

5. The method of claim 1, further comprising:
defining a look-up table of values of durations of the time window and the unmasked portion thereof;
choosing an initial value of the durations of the time window and the unmasked portion thereof;
if a zero-cross event is detected during the masked portion of the time window, choosing increased values of the durations of the time window and the unmasked portion thereof for a successive cycle;
if a zero cross event is not detected during the masked portion of the time window, choosing decreased values of the durations of the time window and the unmasked portion thereof for a successive cycle depending upon whether
the zero-cross event occurred out of the safety interval,
the durations of the time window and the unmasked portion thereof differ from respective minimum values thereof in the table, and
the durations of the time window and the unmasked portion thereof differ from respective pre-established target values.

6. A circuit for driving an electric motor in a PWM mode comprising:
a comparator coupled to a motor winding of the electric motor and configured to generate a first logic signal representative of a sign of an induced back electromotive force (BEMF) in the motor winding;
an edge detector configured to be input with the first logic signal and with an active mask flag to mask a portion of a time window to detect the BEMF and to generate a pulse synchronous with the detection of a zero-cross of the induced BEMF; and
a control logic circuit configured to be input with at least the pulse and to generate the active mask flag, PWM driving signals for the motor winding, and signals for defining the time window for the motor winding, the control logic circuit configured to
tristate the motor winding during a time window to detect a zero-cross of the BEMF induced in the at least one winding of the electric motor,
monitor a voltage on the tristated motor winding during an unmasked portion of the time window,
detect during the time window a zero-cross event of the induced BEMF,
verify whether the zero-cross event occurred during the unmasked portion of the time window,
modify a duration of the time window and a duration of the unmasked portion of the time window based upon the verification of the zero-cross event,
define a safety interval in the unmasked time window, and
modify the duration of the time window and of the unmasked portion of the time window based upon whether the zero-cross event is detected during the safety interval.

7. The circuit of claim 6, wherein the electric motor comprises a sensorless brushless motor.

8. The circuit of claim 6, wherein the control circuit is also configured to:
generate an active mask flag for masking a portion of the time window;
generate an active safety flag for defining the safety interval;
sample the logic value of the masking flag and the safety flag when the zero-cross event is detected; and
adjust the duration of the unmasked portion of the time window for a successive switching cycle based upon logic values of the masking and safety flags.

9. The circuit of claim 6, wherein the safety interval is equal to half of the unmasked portion of the time window.

10. The circuit of claim 6, wherein the control circuit is also configured to:
define a look-up table of pre-established values of durations of the time window and the unmasked portion thereof;
choose an initial value of the durations of the time window and the unmasked portion thereof;
if a zero-cross event is detected during the masked portion of the time window, choose increased values of the durations of the time window and the unmasked portion thereof for a successive cycle;
if a zero cross event is not detected during the masked portion of the time window, choose decreased values of the durations of the time window and the unmasked portion thereof for a successive cycle depending upon whether
the zero-cross event occurred out of the safety interval,
the durations of the time window and the unmasked portion thereof differ from respective minimum values thereof in the table, and
the durations of the time window and the unmasked portion thereof differ from respective pre-established target values.

11. A control system for driving an electric motor comprising:
a controller configured to operate the electric motor in a pulse width modulation (PWM) mode;
said controller configured to
tristate a motor winding of the electric motor during a time window to detect a zero-cross of the BEMF induced on the motor winding of the electric motor,
monitor a voltage on the motor winding during an unmasked portion of the time window,
detect during the time window a zero-cross event of the induced BEMF,
verify whether the zero-cross event occurred during the unmasked portion of the time window,
modify a duration of the time window and a duration of the unmasked portion of the time window based upon the verification of the zero-cross event,
define a safety interval in the unmasked time window, and
modify the duration of the time window and of the unmasked portion of the time window based upon whether the zero-cross event is detected during the safety interval.

12. The control system of claim 11, wherein the electric motor comprises a sensorless brushless motor.

13. The control system of claim 11, wherein the controller is also configured to:
generate an active mask flag for masking a portion of the time window;

generate an active safety flag for defining the safety interval;

sample the logic value of the masking flag and the safety flag when the zero-cross event is detected; and adjust the duration of the unmasked portion of the time window for a successive switching cycle based upon logic values of the masking and safety flags.

14. The control system of claim 11, wherein the safety interval is equal to half of the unmasked portion of the time window.

15. The control system of claim 11, wherein the controller is also configured to:

define a look-up table of pre-established values of durations of the time window and the unmasked portion thereof;

choose an initial value of the durations of the time window and the unmasked portion thereof;

if a zero-cross event is detected during the masked portion of the time window, choose increased values of the durations of the time window and the unmasked portion thereof for a successive cycle;

if a zero cross event is not detected during the masked portion of the time window, choose decreased values of the durations of the time window and the unmasked portion thereof for a successive cycle depending upon whether the zero-cross event occurred out of the safety interval, the durations of the time window and the unmasked portion thereof differ from respective minimum values thereof in the table, and the durations of the time window and the unmasked portion thereof differ from respective pre-established target values.

16. A method of driving an electric motor in a pulse width modulation (PWM) mode comprising:

tristating a motor winding of the electric motor during a time window to detect a zero-cross of the back electromotive force (BEMF) induced in the motor winding;

monitoring a voltage on the tristated motor winding during an unmasked portion of the time window;

detecting during the time window a zero-cross event of the induced BEMF;

verifying whether the zero-cross event occurred during the unmasked portion of the time window;

modifying a duration of the unmasked portion of the time window based upon the verification of the zero-cross event;

defining a safety interval in the unmasked time window; and modifying the duration of the unmasked portion of the time window based upon whether the zero-cross event is detected during the safety interval.

17. The method of claim 16, wherein the electric motor comprises a sensorless brushless motor.

18. The method of claim 16, further comprising:

generating an active mask flag for masking a portion of the time window;

generating an active safety flag for defining the safety interval;

sampling a logic value of the masking flag and the safety flag when the zero-cross event is detected; and adjusting the duration of the unmasked portion of the time window for a successive switching cycle based upon logic values of the masking and safety flags.

19. The method of claim 18, wherein the safety interval is equal to half of the unmasked portion of the time window.

20. A control system for driving an electric motor comprising:

a controller configured to operate the electric motor in a pulse width modulation (PWM) mode;

said controller configured to tristate a motor winding of the electric motor during a time window to detect a zero-cross of the BEMF induced on the motor winding of the electric motor, monitor a voltage on the motor winding during an unmasked portion of the time window, detect during the time window a zero-cross event of the induced BEMF, verify whether the zero-cross event occurred during the unmasked portion of the time window, modify a duration of the unmasked portion of the time window based upon the verification of the zero-cross event, define a safety interval in the unmasked time window, and modify the unmasked portion of the time window based upon whether the zero-cross event is detected during the safety interval.

21. The control system of claim 20, wherein the electric motor comprises a sensorless brushless motor.

22. The control system of claim 20, wherein the controller is also configured to:

generate an active mask flag for masking a portion of the time window;

generate an active safety flag for defining the safety interval;

sample the logic value of the masking flag and the safety flag when the zero-cross event is detected; and adjust the duration of the unmasked portion of the time window for a successive switching cycle based upon logic values of the masking and safety flags.

23. The control system of claim 20, wherein the safety interval is equal to half of the unmasked portion of the time window.

* * * * *